United States Patent
Maxson

[19]

[11] Patent Number: 6,051,131
[45] Date of Patent: Apr. 18, 2000

[54] FLOW MODIFIER FOR SUBMERGED INTAKE SCREEN

[75] Inventor: Richard C. Maxson, Maple Grove, Minn.

[73] Assignee: United States Filter Corporation, Palm Desert, Calif.

[21] Appl. No.: 09/164,238

[22] Filed: Sep. 30, 1998

[51] Int. Cl.⁷ .................................................. B01D 33/00
[52] U.S. Cl. ........................ 210/162; 210/170; 210/460
[58] Field of Search .................................... 210/161, 162, 210/170, 438, 459, 460

[56] References Cited

U.S. PATENT DOCUMENTS

| | | | |
|---|---|---|---|
| 705,364 | 7/1902 | Kurtz | 210/460 |
| 1,274,121 | 7/1918 | White | 210/162 |
| 2,249,020 | 7/1941 | McFarlin | 210/460 |
| 2,572,173 | 10/1951 | McFarlin | 210/460 |
| 2,957,579 | 10/1960 | McCombie | 210/460 |
| 3,037,636 | 6/1962 | McFarlin | 210/460 |
| 4,261,822 | 4/1981 | Richardson | 210/161 |
| 4,822,486 | 4/1989 | Wilkins et al. | 210/170 |

OTHER PUBLICATIONS 9 page paper entitled The Johnson Screen for Cooling Water Intakes presented at the Larval Exclusion Workshop in San Diego CA in Feb. 1978. The paper was subsequently transmitted to Argonne National Laboratory in late Feb. 1978 and was published in the proceedings dated Aug. 1978.

Primary Examiner—Christopher Upton
Attorney, Agent, or Firm—Barry L. Clark

[57] ABSTRACT

Improved flow modifier assembly for a water intake system having a cylindrical intake screen prevents damage to fish and other aquatic organisms by providing a controlled velocity profile which causes the average flow velocity to closely approach the peak flow velocity. By extending two or more concentric tubular flow modifiers into one end of the screen, it is possible to achieve flow uniformities of more than 90%, as compared to a maximum of about 72% for a prior art configuration utilizing a single tube flow modifier. In addition, the size, weight and cost of screen required can be greatly reduced for a given peak flow velocity as compared to prior art devices.

5 Claims, 3 Drawing Sheets

INTAKE SCREEN CYLINDER
w/ DOUBLE PIPE FLOW MODIFIER

INTAKE SCREEN CYLINDER
w/ SINGLE PIPE FLOW MODIFIER

INTAKE SCREEN TEE ASEMBLY
w/ SINGLE PIPE FLOW MODIFIER

INTAKE SCREEN CYLINDER
w/ DOUBLE PIPE FLOW MODIFIER

INTAKE SCREEN CYLINDER
w/ MULTIPLE FLOW MODIFIER PIPES

FLOW MODIFIER FOR SUBMERGED INTAKE SCREEN

BACKGROUND OF THE INVENTION

Major manufacturing plants, large cities, irrigation systems and power generation facilities require large quantities of water for their successful operation. For reasons of economy and to facilitate inspection, it is desirable that the length of the collection pipe which must be placed in a body of water such as a lake or a river be minimized. It is also desirable that the screen assembly which filters the water entering the collection pipe be of as small a size as possible. Still more important, however, is the necessity of protecting fish and other aquatic organisms from harm and preventing buildup of debris along the length of the screen by ensuring that the maximum peak flow velocity through any of the slots of the intake screen is kept at 0.5 feet per second or below. One prior art flow modifier comprises a single pipe which extends within a screen cylinder. The single pipe flow modifier is typically 50% of the diameter of the screen cylinder and about 33% of its length. This prior art arrangement is able to increase the flow uniformity, which is the ratio of the average to peak flows, to about 72% as compared to just 32% for a cylinder without a flow modifier.

SUMMARY

It is among the objects of the present invention to provide a flow modifier structure for a cylindrical intake screen assembly which will provide a degree of protection to aquatic life and prevention of debris buildup. It is an additional object to provide such protection with a structure which permits the use of a smaller diameter screen assembly than previously required. A still further object is to provide an average flow uniformity through the screen surface which is very close to the allowable peak flow velocity. These and other objects are attained by the flow modifier and intake screen assembly of the present invention. The screen is preferably cylindrical and of a length equal to about 85–140% of its outer diameter. However, it is most preferable that the length and diameter of the cylinder be equal so as to achieve the most desirable flow distribution and to minimize the amount of material in the screen member. Such a shape would most closely approach the ideal screen shape which would be spherical, but which would be extremely difficult and expensive to fabricate from wire wound screen having a constant slot width. The intake screen assembly preferably includes two or more internal flow modifier tubes projecting concentrically into one end of the axial length of the cylindrical screen. Proceeding radially inwardly from the cylindrical screen surface, each successive tube is somewhat smaller in diameter than the previous one and extends a greater distance into the screen cylinder. The flow modifier tubes each have a diameter, the largest of which is about 60% or less of the diameter of the screen. They also preferably have cross-sectional inlet flow areas which are approximately equal. The design results in the maximum or peak velocity of flow into the screen at any point along its length being very close to the design average velocity. The design average velocity is determined by the volume of water being drawn by the system's pump into the flow modifier tubes divided by the open area of the screen. For the most commonly acceptable peak slot velocity of 0.5 feet per second, the improved design can provide an average slot velocity of at least 0.46 feet per second as compared to an average slot velocity of about 0.36 feet per second for a single tube flow modifier or only about 0.16 feet per second for a system where there is no flow modifier tube.

The slots of the screen comprise the space between the wraps of profiled wire which form the cylindrical screen surface. The shape of the screen wire is important since it has been found that the smooth surface created by a construction with the base of a trapezoidal wire facing outward enhances the sliding of debris over the screen surface. The slots could also be formed in the wall of a solid pipe member. In the wrapped wire embodiment, the slots can be either transverse or parallel to the axis of the screen. In the latter arrangement, the wrapped screen would have to be cut along its length, flattened, rolled into a cylinder and welded. For larger sizes, the expense of performing these additional fabricating steps can often be offset by reduction in the amount of reinforcement material required to provide the strength necessary to resist collapse since the screen bars to which the wires are welded will be oriented circumferentially where they provide substantial hoop strength. Where the flow modifier structure comprises two tubes or pipes, it is preferred that the larger diameter one be about 50% of the screen diameter and about 16% of the length of the screen, while the smaller diameter pipe, which is nested within the outer pipe, has a diameter about 70% that of the outer pipe and a length which extends about 67% of the length of the screen cylinder. Such an arrangement has been found to yield a flow uniformity of over 90%. While the flow modifiers have been referred to as pipes, this term is intended to include hollow shapes fabricated from rolled sheets.

BRIEF DESCRIPTION OF THE DRAWINGS

FIG. 1-A is graph which plots slot velocity against distance from the outlet end and illustrates the screen velocity profile for the prior art intake screen of FIG. 1.

FIG. 2-A, is graph which plots slot velocity against distance from the outlet end and illustrates the screen velocity profile for the prior art intake screen of FIG. 2.

FIG. 4-A is graph which plots slot velocity against distance from the outlet end and illustrates the screen velocity profile for the intake screen of FIG. 4.

DETAILED DESCRIPTION OF THE DRAWINGS

Figure 1A:
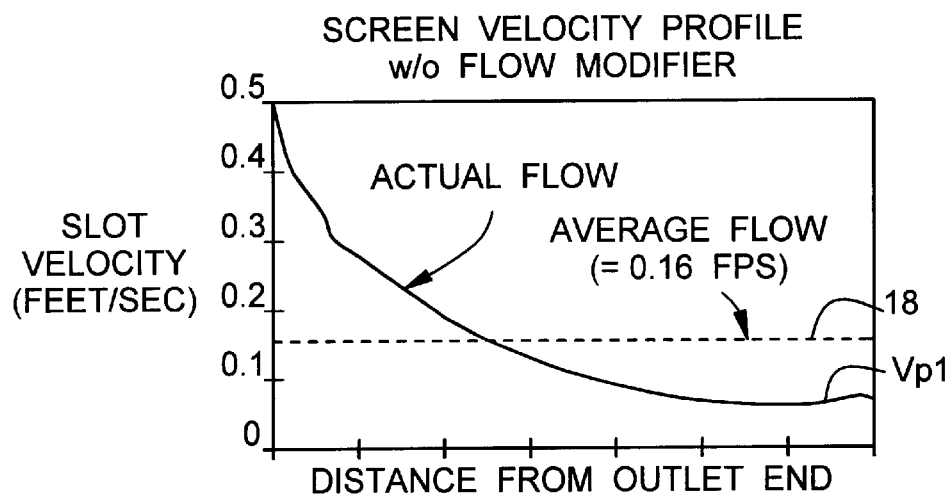
FIG. 1 is a side view illustrating a prior art intake screen which has no flow modifier.
Figure 1:
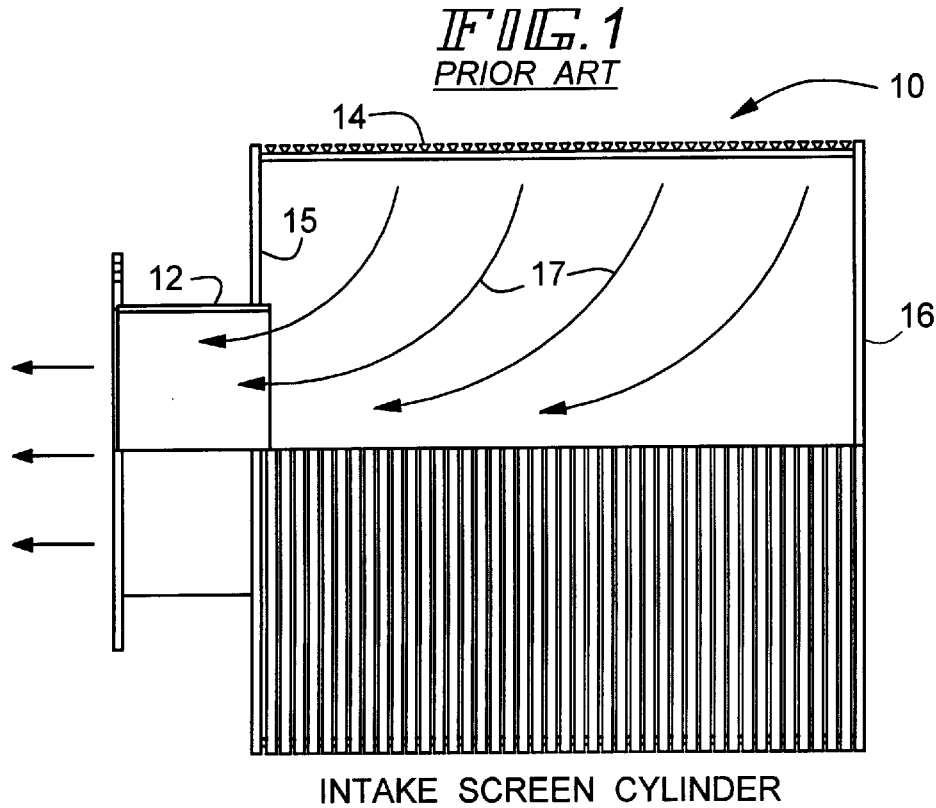

Referring to FIG. 1, a prior art intake screen assembly is indicated generally at 10 and includes an outlet pipe portion 12 and a length of screen 14 integrally attached to the outlet pipe portion 12 by an inner end cap in the form of an annular flange portion 15. The screen 14 is closed at its outer end by an outer end cap or plate 16. The flow enters through the surface of the screen, as shown by the arrows 17, and exits through the outlet pipe 12. As can be seen in the velocity distribution curve $V_{p1}$ in FIG. 1A, the flow is highest at the points on the screen which are near to the point of withdrawal from the screen. Thus, the actual flow at the left end of the screen 14 is about 6 times as much as the flow at the right end. If the screen is sized to cause the flow at the left end to be at the peak allowable velocity of 0.5 feet per second, the flow at the right end will be well below 0.1 fps and the average flow velocity, indicated by the dotted line 18, will only be about 0.16 fps.

Figure 2A:
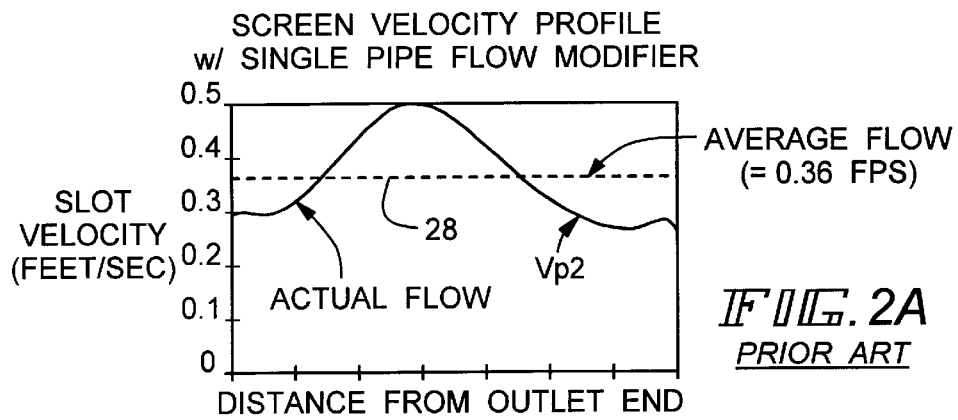
FIG. 2 is a side view, partially broken away, illustrating a prior art intake screen having a single tubular flow modifier.
Figure 2:
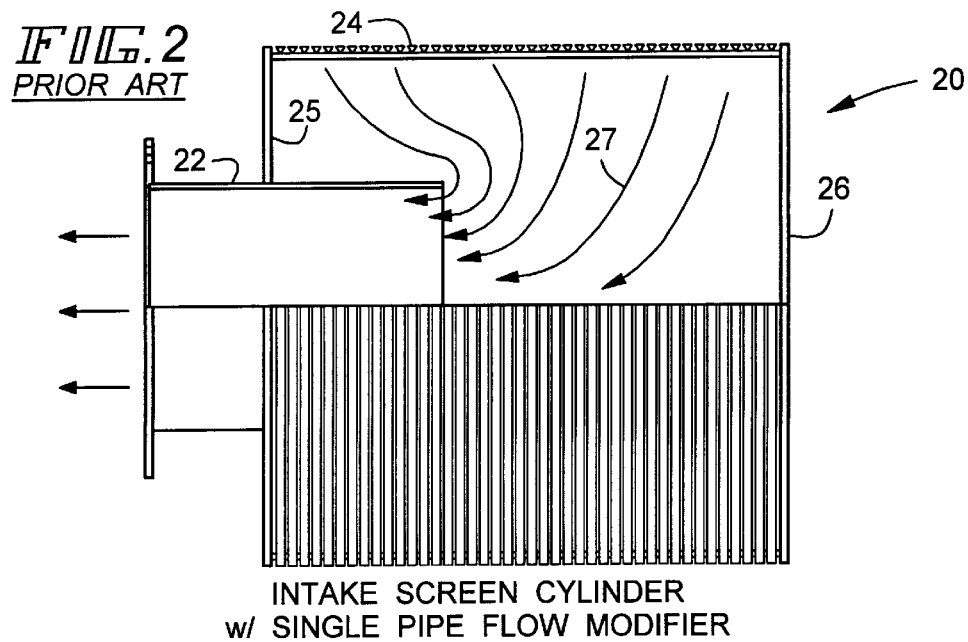

Referring to FIG. 2, a prior art intake screen assembly indicated generally at 20 is shown as including an outlet pipe portion 22 and a length of screen 24 integrally attached to the outlet pipe portion 22 by an inner end cap member 25 and closed at its outer end by an outer end cap member 26. The flow enters through the surface of the screen, as shown by the arrows 27, and exits through the outlet pipe 22. As can be seen in the velocity distribution curve $Vp_2$ in FIG. 2A, when the actual flow rate of the flow entering the screen 24 is at the maximum permissible flow rate of 0.5 fps, the flow rate near the right end will be less than 0.3 fps and the average flow rate indicated by dotted line 28 will be 0.36 fps.

Figure 3:
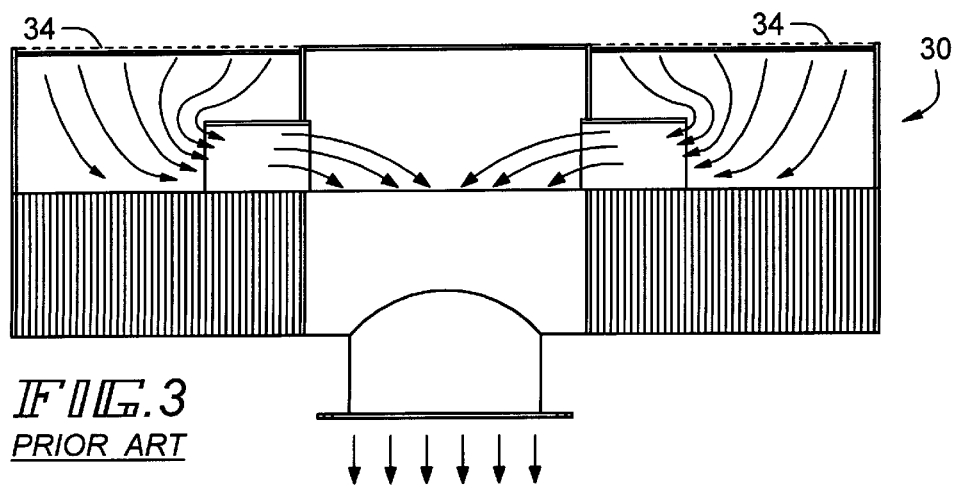
FIG. 3 is a side view, similar to FIG. 2, but illustrating a prior art configuration wherein a pair of screens, each having a single tubular flow modifier are attached to a single connector member.

FIG. 3 shows another prior art assembly 30 which illustrates that a pair of intake screen assemblies 34 can be joined together in a tee configuration which allows the screen diameters to be reduced as compared to the single screen configuration shown in FIGS. 1 and 2.

Figure 4A:
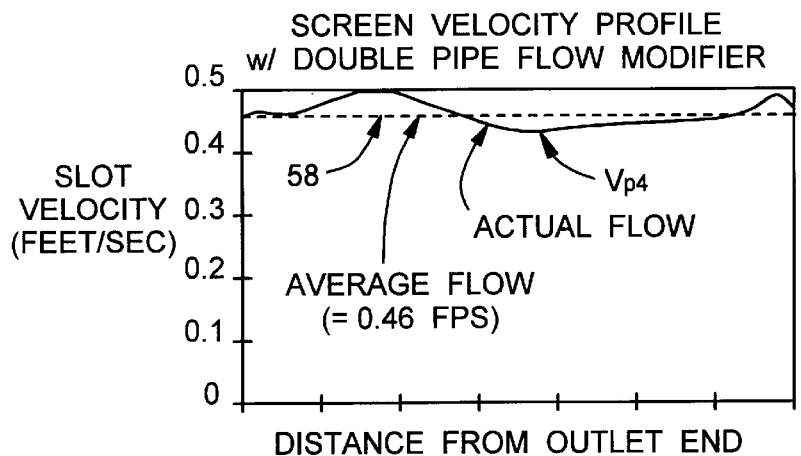
FIG. 4 is a side view, partially broken away, illustrating a preferred embodiment of the improved flow modifier which has two flow modifying pipes projecting into the screen cylinder.
Figure 4:
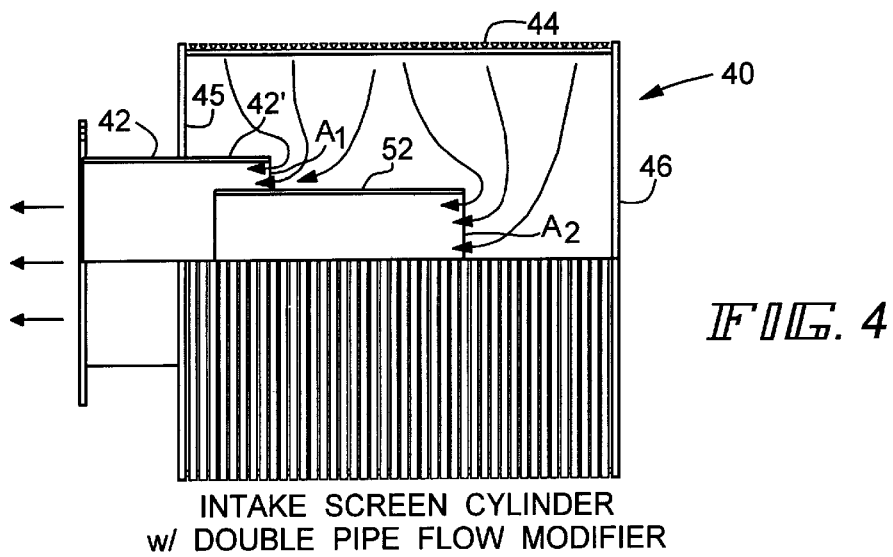

FIG. 4 shows a preferred embodiment of the present invention in which an intake screen assembly indicated generally at 40 includes an outlet pipe portion 42 and a length of screen 44 integrally attached thereto by means of the inner end cap member 45. The right end of the screen 44 is closed by the outer end cap member 46. Preferably, the primary flow modifier portion 42' of the outlet pipe 42 has a length to the right of end cap member 45 which is about 16% of the length of the screen surface 44 between end cap member 45 and end cap member 46, while its diameter is about 50% of the diameter of the screen 44. The right end of the secondary flow modifier portion 52 extends to about 67% of the length of the screen surface 44 between end cap member 45 and end cap member 46. The diameter of secondary flow modifier portion 52 is preferably about 70% of the diameter of primary flow modifier portion 42' so as to cause the annular flow area $A_1$ between flow modifier portions 42' and 52 to be equal to the flow area $A_2$ defined by the open right end of flow modifier portion 52. The secondary flow modifier portion 52 may be mounted within the primary flow modifier portion 42' by any suitable means, such as a plurality of radially extending and circumferentially spaced rib members (not shown).

FIG. 4-A shows the velocity distribution curve $Vp_4$ which illustrates the actual flow velocity at various points along the length of the screen 44 in FIG. 4. The average flow velocity indicated by dotted line 58 is 0.46 fps, and is very close to the maximum allowable slot velocity of 0.50 fps. Thus, the flow uniformity is 92% with the improved two pipe flow modifier shown, as compared to 72% for the one pipe prior art design shown in FIG. 2-A and just 32% for the prior art design shown in FIG. 1-A that has no flow modifier.

Figure 5:
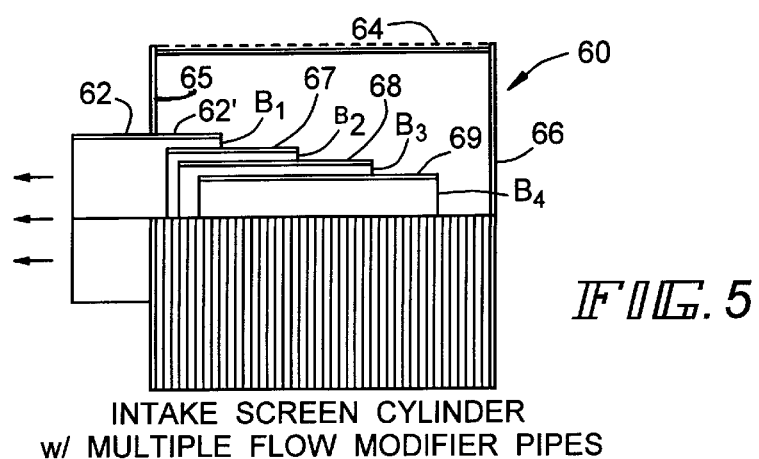
FIG. 5 is a side view, partially broken away, illustrating an embodiment which has four flow modifier pipes to cause the flow uniformity to be even further enhanced as compared to the dual pipe arrangement shown in FIG. 4.

FIG. 5 shows an alternative screen assembly 60 which is similar to FIG. 4 in that it includes elements 62, 64, 65 and 66 which correspond to elements 42, 44, 45 and 46. However, the design includes four flow modifier portions 62', 67, 68 and 69 whose diameters are sized so as provide equal flow areas $B_1, B_2, B_3$ and $B_4$. Each of the four flow modifier portions are preferably of a length such that its right end will be positioned at the same distance from the previous flow modifier or, in the case of the first flow modifier 62', from the end cap member 65. The largest flow modifier pipe 62' is preferably spaced from the outlet end of screen 64, as defined by end cap member 65, by a distance equal to $1/(2(N+1))$ times the screen length, where N is the number of flow modifier pipes. Thus, in the four pipe system shown in FIG. 5, the pipes 62', 67, 68 and 69 would extend 1/10, 7/20, 3/5 and 17/20 times the screen length. Similarly, in a three pipe system, the pipes would extend 1/8, 11/24 and 19/24 times the screen length away from the outlet end of the screen.

Table 1 shows several parameters for various water intake systems based on the number of flow modifiers associated with them. Assuming a typical flow rate of 2,000 gallons per minute, a screen with a slot width opening of 0.08" would need to have a length and diameter of 54" for the prior art construction shown in FIG. 1 which includes no flow modifier. The use of a single flow modifier pipe in the prior art construction shown in FIG. 2 would allow the screen size to be reduced to 36" long and 36" in diameter. By providing two flow modifier pipes 42' and 52, as shown in FIG. 4, the screen size can be reduced to just 30" long and 30" in diameter. The FIG. 4 design produces a flow uniformity of 92% as compared to 32% and 72% for the prior art embodiments shown in FIGS. 1 and 2, respectively. Although the use of more and more flow modifier pipes, such as the four shown in FIG. 5, could produce slightly higher flow uniformities, their use would also produce higher pressure drops and higher costs for pumping and materials.

TABLE 1

| Number of Flow Modifiers | None FIG. 1 | One FIG. 2 | Two FIG. 4 |
| --- | --- | --- | --- |
| Intake Flow (Gallons per Minute) | 2,000 | 2,000 | 2,000 |
| Slot Opening (Inches) | 0.080 | 0.080 | 0.080 |
| Slot Velocity-Peak (Feet per Second) | 0.50 | 0.50 | 0.50 |
| Slot Velocity-Average (fps) | 0.16 | 0.36 | 0.46 |
| Flow Uniformity | 32% | 72% | 92% |
| Required Screen Diameter (Inches) | 54 | 36 | 30 |
| Required Screen Length (Inches) | 54 | 36 | 30 |
| Screen Open Area (Sq. Inches) | 4,919 | 2,186 | 1,518 |
| Inner Flow Modifier Dimensions- Dia. (In.) | — | — | 10.6 |
| Length (Inches) | — | — | 20 |
| Area (Sq. Inches) | — | — | 88 |
| Outer Flow Modifier Dimensions- Dia. (In.) | — | 18 | 15 |
| Length (Inches) | — | 12 | 5 |
| Area (Sq. Inches) | — | 254 | 176 |
| Annulus Area (Sq. Inches) | — | — | 88 |

While the invention has been particularly shown and described with reference to the preferred embodiments thereof, it will be understood by those skilled in the art that various alterations in form and detail may be made therein without departing from the spirit and scope of the invention.

I claim:

1. In an inlet screen assembly for a water intake system comprising a screen member having a generally cylindrical screen surface, said screen member being closed at its outer end by an outer end cap member, said screen member being partially closed at its inner end by an inner end cap member, said inner end cap member having an outlet pipe member attached thereto for carrying away water which has passed through said screen surface, said outlet pipe having a diameter which is substantially smaller than the diameter of the screen surface, and flow modifier means positioned inside said generally cylindrical screen surface for directing water to said outlet pipe and for causing the flow entering the screen surface along the entire length thereof to have a flow uniformity in excess of 75% where the flow uniformity is defined as the average flow velocity through the screen surface divided by the peak velocity at any point along its length; the improvement wherein said flow modifier means comprises at least two pipe member portions extending axially along a portion of the axial length of said screen member, each of said at least two pipe member portions being radially spaced from each other and the innermost of said at least two pipe member portions extending axially further than the pipe member portion which is radially adjacent to it.

2. An inlet screen assembly for a water intake system according to claim 1 wherein the diameter of the innermost pipe member portion is such that its internal cross-sectional area is about 50% of the cross-sectional area of the pipe member portion radially adjacent to it.

3. An inlet screen assembly for a water intake system according to claim 2 wherein the innermost pipe member portion extends about ⅔ of the length of the screen cylinder and the outermost pipe member portion extends about ⅙ of the length of the screen cylinder.

4. An inlet screen assembly for a water intake system according to claim 1 consisting of multiple pipes wherein the diameters of each pipe are such that the internal cross-sectional area of the smallest pipe and the cross-sectional area between radially adjacent pipes are essentially equal to each other.

5. An inlet screen assembly for a water intake system according to claim 4 wherein the ends of the successive pipes are evenly spaced between each other and the largest pipe is spaced a distance equal to $1/(2(N+1))$ x the screen length away from the outlet end, where N is the total number of pipes.

* * * * *